Aug. 29, 1961    A. B. ZEISSLER    2,998,537
DYNAMOELECTRIC MACHINE
Filed Jan. 2, 1959

INVENTOR
ALBERT B. ZEISSLER
By James R. Campbell
His Attorney

United States Patent Office 2,998,537
Patented Aug. 29, 1961

2,998,537
DYNAMOELECTRIC MACHINE
Albert B. Zeissler, Scotia, N.Y., assignor to General Electric Company, a corporation of New York
Filed Jan. 2, 1959, Ser. No. 789,223
6 Claims. (Cl. 310—64)

The invention described herein relates to dynamoelectric machines and more particularly to an improved arrangement for preventing displacement of coil end turns of form wound rotors.

The Peterson et al. Patent 2,747,119, assigned to the same assignee as the present invention, teaches the concept of winding a plurality of layers of resin impregnated glass roving on rotor end turns for preventing their radial displacement during operation of the machine. Continuous developmental work carried forward from the Peterson et al. invention shows that desirable advantages can be derived from banding both the inner and outer end turns of form wound coils with similar roving.

As is well known in the dynamoelectric machine art, the end turns of rotors are directly affected by centrifugal and magnetic forces which causes movement in a radial direction when subjected to high speeds and load currents. To overcome these undesirable attributes, banding wire of small diameter is wound on the peripheral surface of the end turns thus permitting higher peripheral speeds and increase in the machine power rating. During manufacture of the rotor, the coil end turns are drawn inwardly by the wire and with the desired degree of deflection until they rest on a heavy metal flange attached to a spider supporting the rotor laminations or punchings. The flange further serves the function of centering the winding for assuring proper and permanent mechanical balance. To preclude establishment of short circuits, insulation is positioned between the flange and the surfaces of the inner coil end turns and between the inner and outer coil end turns for electrically isolating the current carrying elements.

The disadvantages of this construction is that voltages are induced in the banding wire when the rotor passes through the varying magnetic fields even though the wire is made of nonmagnetic material. This represents a loss of power which is in addition to the normal electrical losses in the machine. In the event of wire breakage, the remaining portions thereof unwind rapidly because the wire is applied to the end turns with a high degree of tension during the course of manufacture. Since the stator end turns are located in close proximity to the rotor, the loose wire usually engages them with sufficient force to tear and rupture the insulation and cause even more extensive damage when it becomes tangled with either or both of the stator and rotor coil end turns. The likelihood of this destructive action taking place is not remote because the loose end of the banding wire is soldered in place and is subject to melting when the motor is operating under heavy loads. When clips are used in lieu of solder as the securing element, they also are apt to work loose and permit the wire to unwind in the manner described above.

Another important disadvantage is that the flange precludes circulation of air between and through the end turns because it occupies substantially the full axial space between the rotor core and the outer edges of the end turns. Since the rating of this type of motor is partly dependent on the degree of heat dissipation from the end turns, the use of a flange which restricts air circulation in effect limits the machine rating. In addition, the banding wire is of such small diameter that it can create localized rupture of the coil insulation to establish short circuits between adjacent coils.

It is apparent that the need exists for an improved coil end turn banding arrangement which will permit manufacture of higher quality motors while minimizing the possibilities of damage to the machine.

It therefore is an object of my invention to overcome the above disadvantages of prior art machines by replacing the banding wire on form wound rotor end turns with a non-conductive material capable of withstanding the same forces while providing a higher degree of protection to the machine.

Another object of my invention is to reduce the size of a supporting flange positioned between the end turns and the shaft for permitting circulation of air between the end turns and thereby providing a machine having greater power output.

In carrying out my invention, I replace the conventional steel banding wire used on form wound end turns with resin impregnated glass roving. The roving is initially flexible and because of its great tensile strength, can be wound either by hand or under tension. Upon curing, it forms a hard rigid mass capable of absorbing the outwardly directed forces when the rotor is placed in operation. In the preferred form, the rotor is equipped with both inner and outer coils in each core slot and the roving is applied concentrically on the outer peripheral surface of both rows of inner and outer end turns. The characteristic of the roving permit its use along the end turn axial length or it can be spaced therealong to provide circumferential openings for ventilation purposes. Use of the roving in this manner allows substantial reduction in the size of the end turn support flange formerly used, thus furnishing a void space inwardly of the coil end turns through which air can flow prior to passage radially between the end turns for dissipating heat generated during rotor operation.

While the specification concludes with claims particularly pointing out and distinctly claiming the subject matter which I regard as my invention, it is believed the invention will be better understood from the following description taken in connection with the accompanying drawings in which:

Figure 2:
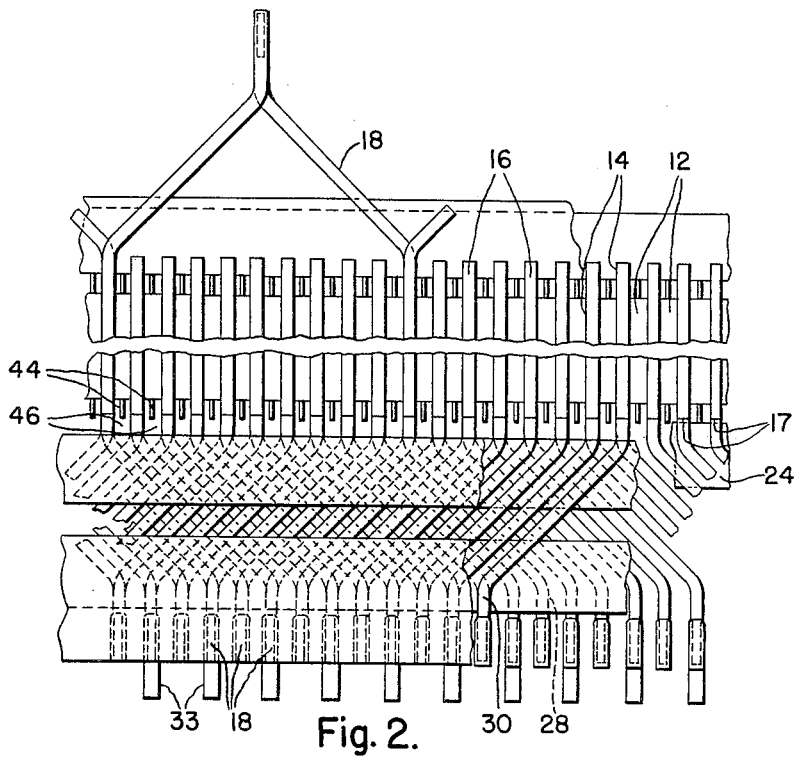
FIGURE 2 is a rolled out view of a portion of the rotor's conductors illustrated in FIGURE 1.
Figure 1:
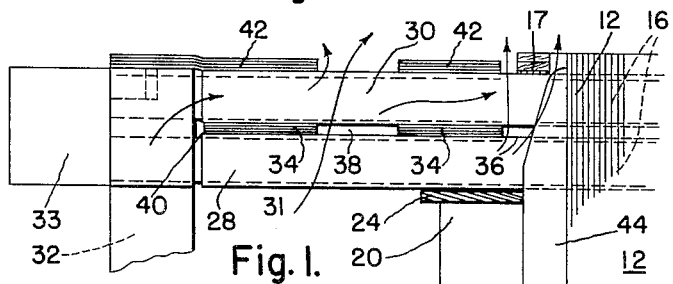
FIGURE 1 is a view in elevation of a rotor illustrating the application of glass roving to coil end turns.

Referring now to the drawings wherein like reference characters designate like or corresponding parts throughout the several views, there is shown in FIGURES 1 and 2, a shaft 10 supporting a plurality of laminations 12 having conductor slots 14 therein for receiving conductor bars 16 and slot wedges 17. As illustrated in FIGURE 2, the bar conductors emerge from spaced slots on both sides of the rotor to form end turns 18. Depending on the requirements for the machine, either one or a number of bars will appear in each conductor slot. In the embodiment illustrated, alternate end turns are equipped with a fan clip 33 as shown, and thus project axially outward from the end turns to provide a fan for circulating air thereacross. This invention is described in relation to a particular type of bar wound rotor but it will be evident that it will have application not only to other types of rotors, such as random wound rotors, but also, to stators having bar or random coils and other electrical equipment provided with conductors subject to centrifugal and/or magnetic forces.

Referring more specifically to the drawing, it will be seen that a flange ring 19 including a supporting surface 20 is secured directly to the rotor laminations supported on the shaft. In the alternative, the ring may be secured to a shaft supported spider which in turn holds the laminations.

In prior constructions using banding wire, the flange ring has a shoulder which extends axially from the core to a point near the outer edge of the end turns for providing a flange of substantial length on which the end turns are supported. As previously mentioned, the end turns are drawn against the flange by the banding wire to provide a compact and rigid structure effective in preventing end turn displacement. In the invention described herein, the flange is reduced to about one-fourth the axial length of prior rings but is attached to the shaft or spider in the same manner. Insulation 24 is disposed circumferentially on the flange for electrically isolating the inner end turns from the exposed iron in the flange body.

As illustrated, the inner and outer coil end turns 28 and 30 lie in planes concentric with the shaft and copper strips or conductors 32 interconnect the coil end turns with slip rings, not shown, in the usual manner.

During manufacture a dummy flange of substantially the same diameter as the inner end turns is positioned adjacent the rotor core. The inner bars 28 are placed in the slots and resin impregnated glass roving 34 is wrapped circumferentially on their outer surfaces to draw the end turns inwardly against the dummy flange. Preferably, the roving is spaced from the core as indicated at 36, to provide an avenue for ventilating air, although in some instances it may be wound in abutting relationship with the core. A central air passageway is also desirable so the roving may be interrupted along the end turn length, as at 38, prior to terminating at 40 adjacent the end turn extremities. The roving may be applied under tension or hand wrapped according to the requirements for a particular machine although it is preferable that the roving be applied under tension. In doing so, the inner end turns are deflected a slight amount so that they all fall in the same concentric plane and are restrained against outward movement when the resin in the roving is subsequently cured.

The outer coils 30 are then positioned in the rotor slots and their end turns likewise bound with similar glass roving 42 which is spaced in the same manner as the roving on the end turns therebeneath. Since these end turns are in radial alignment with those located inwardly, they can be deflected to the point where they contact the roving on the inner end turns. The rotor is then dipped in a varnish according to present practices and subjected to a temperature sufficient to cure the resin in the glass roving. Removal of the dummy flange can then be made safely since the roving does not contain any energy tending to force the end turns inwardly.

The iron flange of the prior art cannot be removed after application of the banding wire because the wire is applied under tension to deflect the end turns into firm engagement with the peripheral surface of the flange. Energy is therefore stored in the banding wire in much the same manner as a stretched spring and removal of the flange which absorbs the inwardly directed forces, would permit the wire to expend its energy on the unsupported end turns and cause them to deflect toward the shaft.

The banding of the inner bars directly reduces the amount of banding required on the periphery of the outer bars since the inner banding can support the outward forces when the rotor is placed in operation.

With the end turns bound with glass roving in the manner described above, a large unoccupied area exists between the coil end turns and the shaft, thereby providing a large opening through which air can be circulated in heat exchange relationship with the coil end turns. As shown in FIGURE 1, the air assumes the path illustrated by the arrows and is effective in completely ventilating the coil end turn structure for carrying away heat from the machine. Space blocks 44 are also employed for spacing the ring 19 from the core to permit circulating of air over the end turns in those areas adjacent the core prior to discharge at 46 from the machine.

The particular type of glass roving used for binding purposes is more fully described in the Coggeshall et al. Patent 2,747,118 and comprises a thermosetting, storable, tack free, impregnated roving consisting of a loosely constructed body of substantially parallel glass fibers impregnated with a heat reactive composition from which the solvent is eliminated after impregnation of the roving. Resin sold under the trade name of Permafil by General Electric Company imparts the desired characteristics to the roving. Obviously, other types of resins may be used in the glass roving providing they have the same or similar characteristics as that defined in the Coggeshall et al. patent. This roving is in a partially cured state when it is applied to the end turns but that is not a necessary attribute. The copending patent application of A. D. Coggeshall, Serial No. 784,744, filed January 2, 1959 and entitled "Improved Glass Roving" discloses glass roving containing a fully cured resin which can be used successfully for banding end turns.

The use of ribbons, tapes, ropes, and the like, may also be used since the glass filaments therein are substantially parallel and provide the desired degree of tensile strength.

Figure 3:
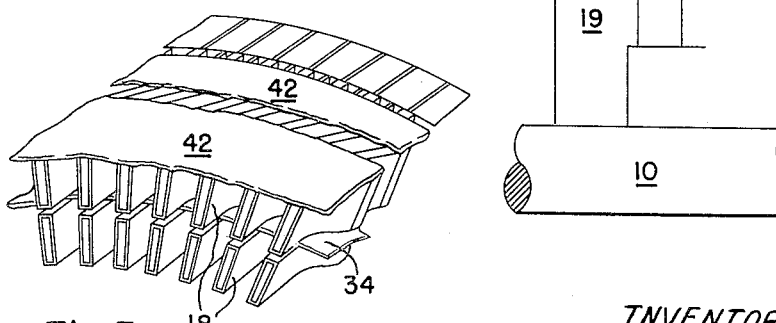
FIGURE 3 is an enlarged perspective view of a modification illustrating the disposition of glass roving on the end turns.

Although a particular spacing arrangement of the roving on the end turns has been disclosed, it will be evident that many different variations may be resorted to for accomplishing a specific mode of cooling. For example, a number of roving wrappings 34 and 42, FIGURE 3, may be spaced along the end turn length, and at different distances on both the inner and outer end turns, for achieving a particular type of air flow pattern. Such air flow pattern may take the form of a circuitous path for example, in which the air is caused to change direction between the inlet on the inwardly directed portions of the end turns and the outlets located around the end turn peripheral surface. The space blocks 44 may be omitted if desired.

A particular type of machine has been used to illustrate the invention because it also shows how the flange can be reduced in size. In some rotors, after binding the end turns are held in position at operating speeds without resorting to use of the flange ring, although a dummy flange should be used during the banding process. This invention therefore also envisions elimination of the steel flange used in present machines since banding will provide the degree of protection necessary for safe operation.

Obviously, many modifications and variations are possible in light with the above teachings. It therefore is to be understood that within the scope of the appended claims, the invention may be practiced otherwise than as specifically described.

What I claim as new and desire to secure by United States Letters Patent is:

1. A magnetic core for use in a dynamoelectric machine comprising a shaft supporting a plurality of laminations having slots therein for receiving coils equipped with end turns extending outwardly from each end of the core, resin impregnated glass roving placed in direct contact with the peripheral portions of said end turns for restraining the end turns against radial displacement during operation, said roving being spaced at intervals along the axial length of the end turns to permit unimpeded circulation of air between adjacent end turns for carrying away heat generated during operation.

2. A magnetic core for use in a dynamoelectric machine comprising a shaft supporting a plurality of laminations having conductor slots therein for receiving coils equipped with end turns extending outwardly from each end of the core, a cylindrical ring including a flange having a diameter slightly less than the distance between oppositely disposed slots in the core placed adjacent the laminations on each end of the core, insulation separating the end turns and said flanges, and resin treated nonmetallic roving spaced at predetermined intervals on the peripheral portions of the inner and outer coil end turns for holding the latter against radial displacement during operation and for providing open areas between adjacent end turns to permit circulation of air used in carrying away heat.

3. The combination according to claim 2 wherein means space said rings from the core to provide an exit for air drawn into the void area formed by the concentrically disposed end turns and thereby provide a medium to which heat can be transferred from the end turns when the core is placed in operation.

4. A magnetic core for a dynamoelectric machine comprising a shaft supporting a plurality of laminations having conductor slots therein for receiving coils equipped with end turns extending outwardly from each end of the core, inner and outer coils in each slot having end turns lying in planes concentric with the shaft, a cylindrical ring spaced from but secured to the core and having a flange underlying said end turns, resin impregnated glass roving applied to both the inner and outer end turns with sufficient tension to deflect them into contact with said flange, said roving being spaced at predetermined intervals along the length of the end turns to provide openings through which air can be circulated in contact with the end turns to remove heat generated therein during operation.

5. The combination according to claim 4 wherein the roving comprises bands spaced at the same intervals on both the inner and outer end turns to provide uninterrupted flow of air from an area inside the end turns to a point radially exterior thereto.

6. The combination according to claim 4 wherein the roving comprises bands spaced at irregular intervals on both the inner and outer end turns to cause air to flow circuitously through the openings provided by the irregularly spaced bands on the end turns.

References Cited in the file of this patent

UNITED STATES PATENTS

| | | |
|---|---|---|
| 894,553 | Reist | July 28, 1908 |
| 2,519,219 | Baudry et al. | Aug. 15, 1950 |
| 2,747,119 | Petersen et al. | May 22, 1956 |